United States Patent
Schvartzblat et al.

(10) Patent No.: US 11,062,069 B1
(45) Date of Patent: Jul. 13, 2021

(54) BOUNDED DEADLOCK CHECK

(71) Applicant: Mellanox Technologies, Ltd., Yokneam (IL)

(72) Inventors: Shirit Schvartzblat, Tel Aviv (IL); Eytan Dreyfus, Netanya (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/815,044

(22) Filed: Mar. 11, 2020

(51) Int. Cl.
  *G06F 30/3312* (2020.01)
  *G06F 30/3323* (2020.01)
  *G06F 30/327* (2020.01)
  *G06F 119/12* (2020.01)

(52) U.S. Cl.
  CPC ........ *G06F 30/3312* (2020.01); *G06F 30/327* (2020.01); *G06F 30/3323* (2020.01); *G06F 2119/12* (2020.01)

(58) Field of Classification Search
  CPC .............. G06F 30/3312; G06F 30/327; G06F 2119/12; G06F 30/3323
  See application file for complete search history.

(56) References Cited

U.S. PATENT DOCUMENTS

| | | | |
|---|---|---|---|
| 6,408,262 B1 | 6/2002 | Leerberg et al. | |
| 8,302,044 B2 | 10/2012 | Moon et al. | |
| 8,826,201 B1 | 9/2014 | Hanna et al. | |
| 9,767,236 B2 | 9/2017 | Darbari et al. | |
| 2018/0276318 A1* | 9/2018 | Baumgartner | G06F 30/3323 |

FOREIGN PATENT DOCUMENTS

| | | |
|---|---|---|
| CN | 105022692 A | 11/2015 |
| EP | 3261002 A1 | 12/2017 |

OTHER PUBLICATIONS

Biere et al., "Liveness Checking as Safety Checking", Electronic Notes in Theoretical Computer Science 66, No. 2, pp. 1-18, year 2002.

\* cited by examiner

*Primary Examiner* — Vuthe Siek
(74) *Attorney, Agent, or Firm* — Kligler & Associates Patent Attorneys Ltd

(57) ABSTRACT

An apparatus for verification of a digital circuit includes a memory and a processor. The memory is configured to store a model of at least part of the digital circuit and a list of one or more locked-state tests, each locked-state test including a start state, an end state and a radius parameter. The processor is configured to formally prove that for at least one of the locked-state tests, a maximum distance between the start state and the end state is bounded by a number that is not greater than the radius parameter, thereby verifying that the start state is not a locked state.

13 Claims, 4 Drawing Sheets

BOUNDED DEADLOCK CHECK

FIELD OF THE INVENTION

The present invention relates generally to electronic design automation (EDA), and specifically to methods and systems for automatic detection of deadlock and livelock situations in electronic designs.

BACKGROUND OF THE INVENTION

With the soaring manufacturing costs of new process technologies, the importance of verification is ever increasing. From all verification tasks, verifying that a design does not enter a deadlock or a livelock is particularly challenging.

U.S. Pat. No. 8,302,044 describes systems and techniques for checking a livelock in a circuit design, including identifying a finite state machine (FSM) in the circuit design, constructing an abstract machine, identifying livelocks in the abstract machine and, if found, verify that the livelock is a livelock in a concrete machine of the circuit design.

U.S. Pat. No. 9,767,236 describes methods and systems for detecting deadlock in a hardware, including identifying control signals in the hardware design, generating a state machine for each of the control signals to track the state of the control signal, generating one or more assertions for each control signal to detect that the control signal is in a deadlock state from the state machine and detecting whether any of the control signal are in a deadlock state using the assertions. The method may also comprise generating one or more fairness directives to impose on an assertion and detecting if the control signal is in the deadlock state using the assertions under the fairness directives.

SUMMARY OF THE INVENTION

An embodiment of the present invention that is described herein provides an apparatus for verification of a digital circuit, including a memory and a processor. The memory is configured to store a model of at least part of the digital circuit and a list of one or more locked-state tests, each locked-state test including a start state, an end state and a radius parameter. The processor is configured to formally prove that for at least one of the locked-state tests, a maximum distance between the start state and the end state is bounded by a number that is not greater than the radius parameter, thereby verifying that the start state is not a locked state.

In some embodiments, at least one of the locked-state tests further specifies a wait signal, and the processor is configured to measure distances between the start state and the end state while excluding cycles wherein the wait signal is active. In some embodiments, for at least one of the locked-state tests, the start state includes an event wherein a stimulus is applied to the digital circuit, the end state includes an event wherein the digital circuit generates a response responsive to the stimulus, and the radius includes a maximum response time of the digital circuit.

There is additionally provided, in accordance with an embodiment of the present invention, a method for verification of a digital circuit. The method includes storing, in a memory, a model of at least part of the digital circuit and a list of one or more locked-state tests, each locked-state test including a start state, an end state and a radius parameter. Using a processor, it is formally proven that for at least one of the locked-state tests, a maximum distance between the start state and the end state is bounded by a number that is not greater than the radius parameter, thereby verifying that the start state is not a locked state.

There is further provided, in accordance with an embodiment of the present invention, a computer software product. The product includes a tangible non-transitory computer-readable medium in which program instructions are stored, which instructions, when read by a processor, cause the processor to store, in a memory, a model of at least part of the digital circuit and a list of one or more locked-state tests, each locked-state test including a start state, an end state and a radius parameter, and formally to prove that for at least one of the locked-state tests, a maximum distance between the start state and the end state is bounded by a number that is not greater than the radius parameter, thereby verifying that the start state is not a locked state.

The present invention will be more fully understood from the following detailed description of the embodiments thereof, taken together with the drawings in which:

DETAILED DESCRIPTION OF EMBODIMENTS

Overview

Figure 1:
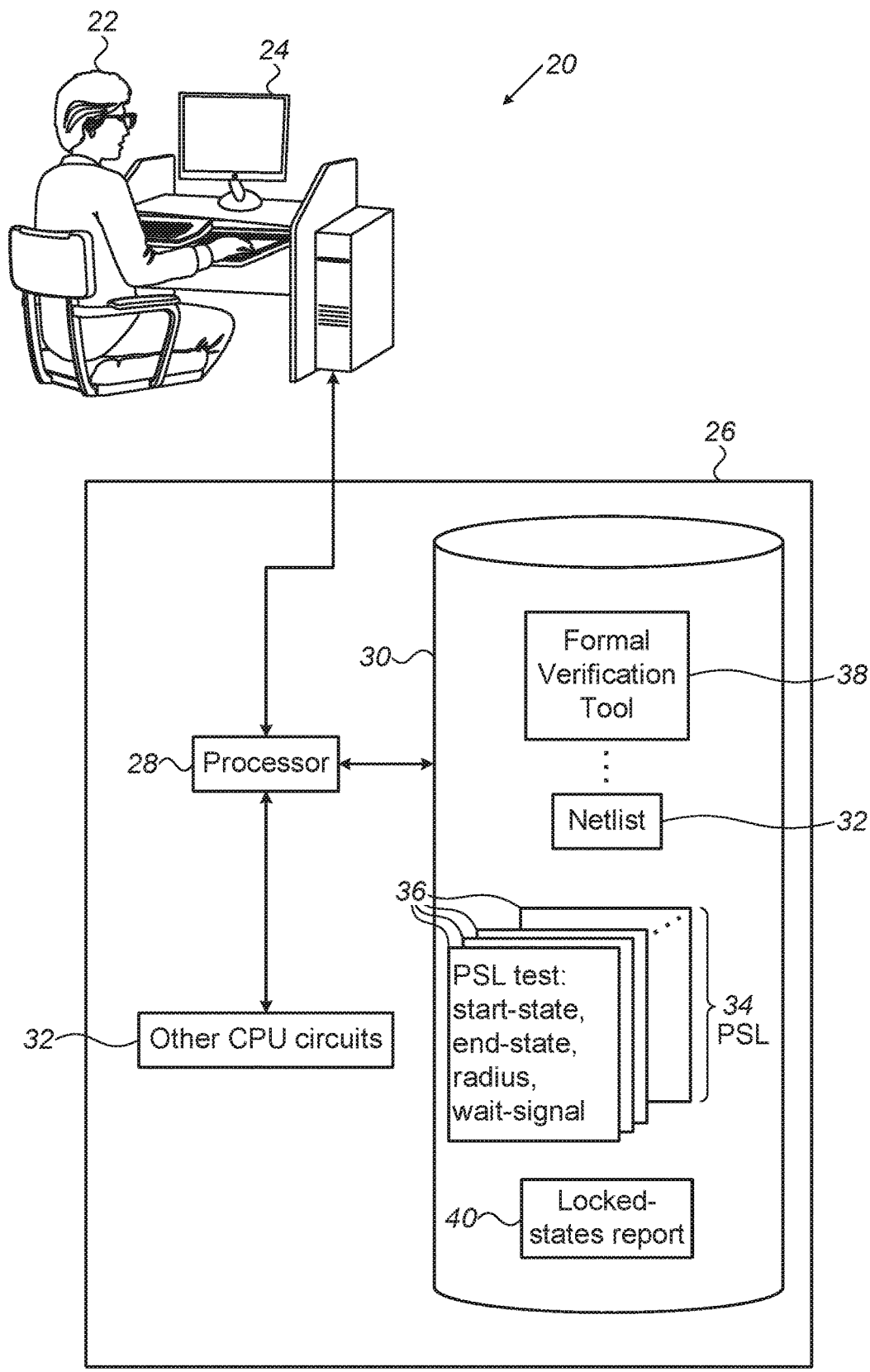
FIG. 1 is a block diagram that schematically illustrates a system for the detection of locked states in an integrated circuit, in accordance with an embodiment of the invention.

The verification of digital circuits which comprise, explicitly or implicitly, one or more finite state machines (FSMs), is considerably more complex than the verification of digital designs that comprise combinatorial logic only, because when there are FSMs in the design, the outputs are affected by the inputs and by past events—rather than by the inputs only. (It should be noted that, although not all designs are expressed in FSM terminology, all practical designs can be represented by FSM.)

One of the more challenging verification tasks when FSMs are present is proving that the FSM will not enter a state or a group of states from which it cannot exit.

Two main types of such scenarios are typically defined: "Livelock", which is a set of states in a design with no path from the set to any other state that is reachable from an initial state of the design; and, "Deadlock", which is a Livelock wherein the set of states comprises a single state. In other words, a deadlock is a state of the design that, once entered, cannot be exited from. A livelock is a set of two or more states of the design that, once entered, cannot be exited from. When in a livelock, the FSM will typically transition among the different states in the set. In the description hereinbelow, we will sometimes refer collectively to deadlock and livelock as "locked-state".

One way to prove that there are no locked states in a design is to run exhaustive simulations, and cover all possible combinations; however, a locked state may be entered after a lengthy pattern of inputs is applied; hence, the number of combinations may be gigantic even for small designs, and such proof is typically impractical. The preferred approach to proving that there are no locked states relies, therefore, on static analysis of the circuit, bounding its operation without simulating the circuit response to various stimuli. Such static analysis is typically done using formal verification techniques. In Formal Verification, a locked state will be defined as a scenario in which an event A will never be followed by event B. (The terms "states" and "events" will be used in the description hereinbelow interchangeably—any state may be defined as an event, and vice versa.)

Formal verification, usually defined as proving or disproving the correctness of a design using mathematical formal methods, comprises proof of Safety properties using safety tools, and proof of Liveness properties using liveness tools. In general, safety tools formally prove that user-defined failures never happen, whereas liveness engines prove that user-defined pass events will eventually happen.

Deadlock and livelock tests can be performed using liveness tools, which prove that all possible paths in the design must include state B (and, hence, state B cannot be a locked state).

When checking for Livelock and Deadlock, it typically makes no sense to check for a loop in an FSM that is designed to loop as long as a given input is not asserted; for example, a counter that does not get a Count-Enable input loops in its last state. This, and other scenarios, is solved by the introduction of a "fairness" directive (for example, in Property Specification Language (PSL))—a signal in the design that is defined as a "fairness signal" with respect to the liveness property must rise within the "loop" (loop is defined as a series of instructions or states that is repeated until a terminating condition is reached). When a fairness directive is added, the liveness tool can limit the searches; for example, a counter may be tested only when an "increment" input of the counter is asserted.

However, even when fairness directives are used, liveness tools are still severely limited in terms of supported design sizes, and, in particular, in terms of the number of states in the design.

Embodiments of the present invention that are disclosed herein provide methods and apparatuses that check for locked states in a design, using safety rather than liveness tools. In some embodiments, the methods may be able to check for locked states in designs that comprise more states than the designs that a liveness-based method can examine, consuming less computing time and/or computing resources.

In embodiments, a user may specify a radius for the design as the maximum number of steps (e.g., clock cycles) from an initial state to any other state in the design. The user may then employ a formal verification tool (e.g., a safety tool) to verify that a state A will always be followed by a state B, within a number of states that is bounded by the radius (this technique will be referred to hereinbelow as "bounded deadlock proof" or "bounded lock-state proof"). As would be appreciated, proving that event B always follows event A within a limited number of cycles infers that event A cannot be a deadlock; nor can event A be a livelock (given that event B is not a livelock).

In some embodiments, a fairness directive, like the one used in liveness engines, can be employed to avoid searching for loops when loops occur as a result of an external signal. In an embodiment, a "wait" signal is specified when the FSM may stall (e.g., when a counter does not receive an Increment input) and used as a fairness directive; the number of cycles during which A must follow B (the "radius") does not include cycles in which the wait signal is on.

Thus, according to embodiments of the present invention that are disclosed herein, safety rather than liveness tools can be used to prove or disprove that a given design is free of locked-sates within a given number of cycles, wherein the number of cycles does not include cycles in which user-defined "wait" signals are on. Using this approach, a considerable reduction in computing costs may be achieved.

System Description

FIG. 1 is a block diagram that schematically illustrates a System 20 for the detection of locked states in an integrated circuit, in accordance with an embodiment of the invention.

System 20 comprises a Computer 26, which comprises a Processor 28, a Memory 30 and Other CPU Circuits 32. A User 22, such as a VLSI verification designer, interacts with Computer 26 through a User Interface 24.

Alternatively, the functions of computer 26 that are described herein may be distributed among two or more separate computers. The functions of computer 26 are typically implemented in software, which runs on processor 28. The software may be downloaded to processor 28 in electronic form, over a network, for example. Additionally, or alternatively, the software may be stored on non-transitory, tangible media, such as optical, magnetic or electronic memory media.

Memory 30 of computer 26 may store, permanently or temporarily, a netlist 32, which is a model of the tested circuit, such as an RTL representation or any other suitable hardware representation. The description that follows refers mainly to a netlist, by way of example. Alternatively, any other suitable type of model of the tested circuit can be used. Memory 30 may further store a Property Specification Language (PSL) script 34, which comprises a plurality of PSL tests 36; a Formal Verification Tool 38, which comprises the code and data of a formal verification tool (e.g., Cadence's JasperGold Formal Verification Platform); and a Locked-State Report 40, which is used to store reports that the formal verification tool may generate.

Each PSL test 36 comprises parameters that processor 28 transfers to formal verification tool 38, pertaining to a plurality of locked-state tests. The parameters comprise a Start-State, an End-State, a Radius and, optionally, a Wait signal name (or a Boolean expression of a wait condition, comprising a plurality of signals names and Boolean operations).

PSL script 34 is typically prepared by a user 22, such as a verification engineer; netlist 32 is typically prepared by a user (or users) such as a design engineer; and Formal Verification Tools 38 is typically purchased from a Computer-Aided Design (CAD) software vendor.

As would be appreciated, memory 30 may comprise any suitable storage medium, including but not limited to random access memory (RAM), hard-disk-drive, non-volatile memory and any combination thereof. The various memory components described hereinabove, including Formal Verification Tool 38, Netlist 32 and PSL script 34, may be moved or copied between memory locations (e.g., a copy of frequently used memory entries may be stored in a fast cache memory). Some or all the memory components may be stored in a different computer or computers and may be copied to memory 30 and/or accessed by processor 28 through a network (not shown).

According to embodiments of the present invention, computer 26 runs PSL script 34 and sequentially calls formal verification tool 38 to execute PSL tests 36. For every test, the processor passes the test parameters to the formal verification tool.

The formal verification tool then, for each test, formally proves that there is no path from the Start State to the End State that includes more than Radius cycles in which Wait is not active. If the tool proves the assertion that no such paths exists, the Start state cannot be a deadlock or part of a livelock, and therefore the test passes; if the tool disproves the assertion, the test fails. PSL script 34 then writes an entry in Locked-States-Report 40, pertaining to the result of the test.

When the processor completes all PSL tests, user 22 can read the locked states report, and see if there are locked states in the design.

The computer system configuration shown in FIG. 1 is an example configuration that is depicted purely for the sake of conceptual clarity. Any other suitable configurations can be used in alternative embodiments. The different computer system elements may be implemented using suitable hardware, such as in one or more Application-Specific Integrated Circuit (ASIC) or Field-Programmable Gate Arrays (FPGA), using software, or using a combination of hardware and software elements. In some embodiments, formal verification tool 38 may be distributed in more than one computer, for example, each computer may execute a subset of the tests defined in PSL script 34. In some embodiments, processor 28 and memory 30 may be in a remote computer or computer (e.g., "cloud computing"), and user 22 may use a local processor to connect to the remote computer, e.g., via the internet.

Figure 2:
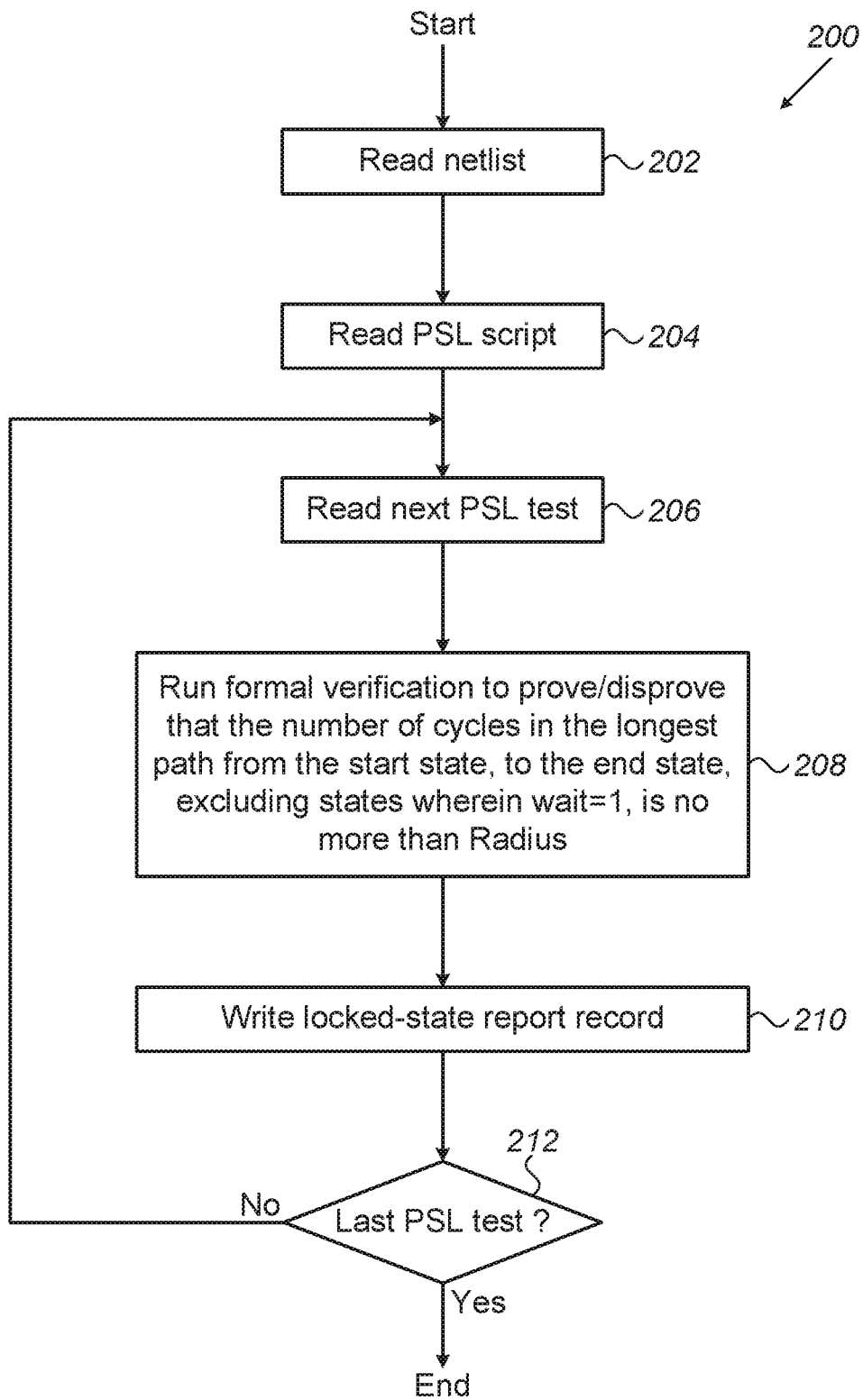
FIG. 2 is a flowchart that schematically illustrates a method for finding locked states in a design, in accordance with an embodiment of the present invention.

FIG. 2 is a flowchart 200 that schematically illustrated a method for finding locked states in a design, in accordance with an embodiment of the present invention. The flowchart is executed by a processor (such as processor 28, FIG. 1).

The flowchart starts at a Reading Netlist step 202, wherein the processor reads the netlist of the circuit to be tested for locked states. The netlist may comprise, for example, a Verilog RTL description of the circuit (or of parts thereof), and reading the netlist may comprise, for example, copying the netlist from a hard disk to a RAM. Next, in a Reading PSL step 204, the processor reads a PSL script, comprising PSL tests, wherein each test comprises a Start-State parameter, an End-State parameter, a Radius parameter and an optional Wait signal parameter.

The processor next enters a Reading Next PSL Test step 206, starting with the first test of the PSL script, and then, in a Running Formal Verification step 208, invokes the formal verification Safety tool. In step 208, the processor executes a bounded locked-states proof, which formally proves or disproves that the lengths of all paths that start at the Start-State and end at the End-State, is no more than the radius parameter. If an optional Wait signal is specified in the present PSL test, the processor, when calculating the length of the paths, will consider only states in which the Wait signal is off (in some embodiment, Wait may be a Boolean expression comprising more than one netlist signal; e.g., wait=X && (~Y||Z).

Next, in a writing Report Record step 210, the processor writes a record that corresponds to the result of step 208 in a Locked-State-Report (e.g., locked-state report 40, FIG. 1).

If, in step 208, the processor proves the test (that is—proves the implicit assertion indicated by the test parameters), the record may indicate that the test passed; whereas if the processor disproves the test, the record may indicate that the test has failed, and specify the maximum distance.

Lastly, in a Checking-Last-Test step 212, the processor checks if the current PSL test is the last PSL script test; if so, the processor will exit the flowchart; otherwise, the processor will re-enter step 206 to run the next bounded locked-state test.

The flowchart shown in FIG. 2 is an example that is depicted purely for the sake of conceptual clarity. In alternative embodiments, for example, a plurality of processors may execute step 208 concurrently, for a single PSL test or for multiple PSL tests. In an embodiment, to save run time, the processor, when in step 208, stops looking for a maximum after finding a first path longer than the radius parameter (and, thus, the report record will not specify the maximum length).

Figure 3:
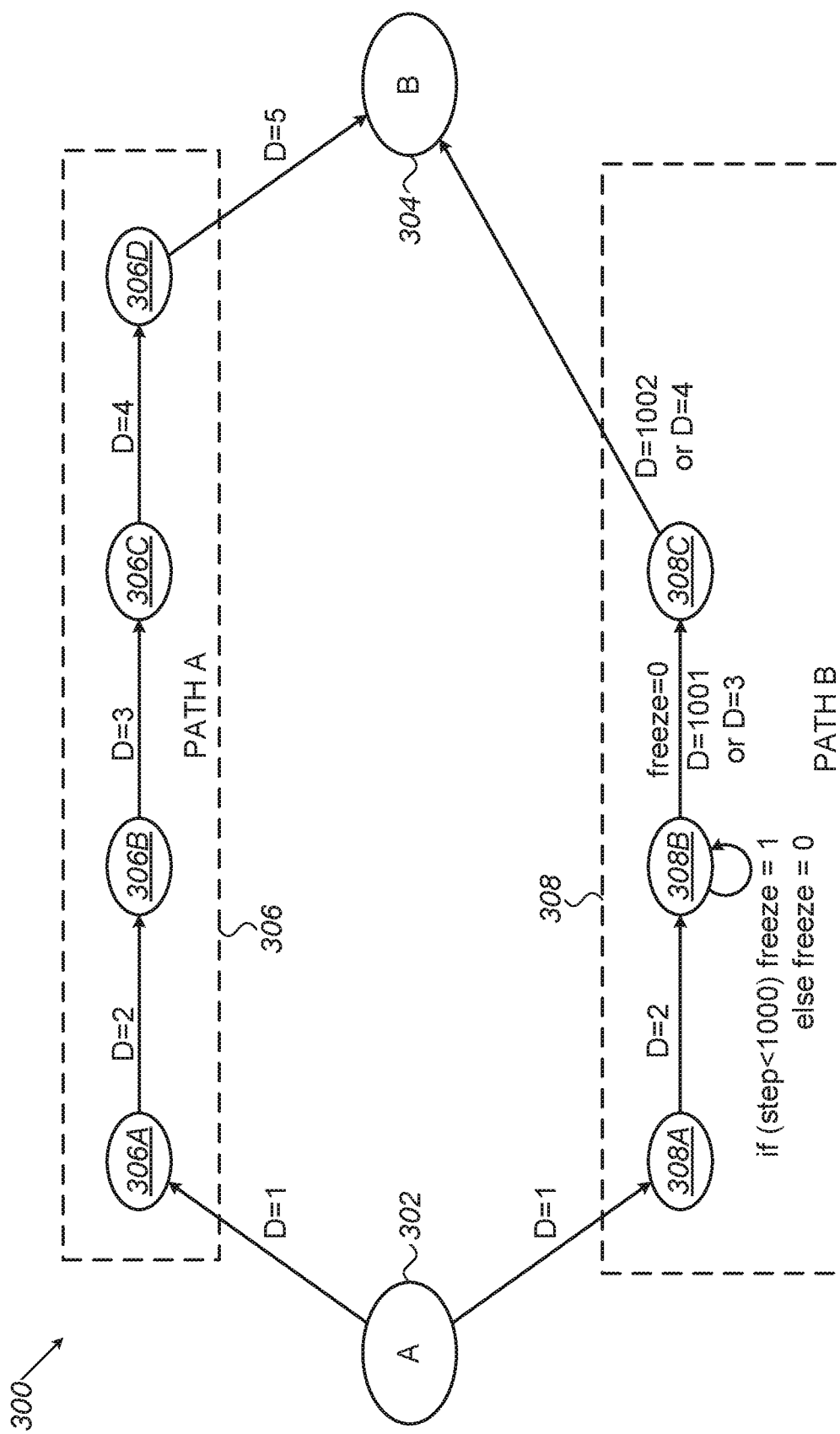
FIG. 3 is a state diagram that illustrates the distances between a start state and an end state in a finite state-machine (FSM), in accordance with an embodiment of the present invention.

FIG. 3 is a state diagram 300 that illustrates the distances between a start state 302 and an end state 304 in a finite state-machine (FSM), in accordance with an embodiment of the present invention. The state diagram comprises a path A 306 and a path B 308. Path A 306 comprises states 306A through 306D, which the FSM enters sequentially (that is—the FSM exits each of the states of path A one clock cycles after entering the state). As illustrated, the length of path A, from state A to state B, is 5 cycles.

Path B 308 comprises states 308A, 308B and 308C. The FSM exits states 308A and 308C one clock cycle after entering the states. However, when the FSM enters state 308B, the FSM checks the status of a Freeze signal; the FSM will remain in state 308B as long as Freeze is on. As, according to the example embodiment illustrated in FIG. 3, Freeze is on for the first 1000 cycles, the length of Path B is 1002. If the radius for FSM 300 locked-states test is, for example, 10, the test will fail.

Using a "fairness" directive, however, a formal verification tool may be directed to ignore cycles in which freeze is on. The corresponding PSL entry may be:
start_state=A;
end_state=B;
radius=10;
wait=Freeze.

When the formal verification tool is invoked with the PSL test shown above, including the fairness directive, the length of path B will be 4, and the test will pass.

As would be appreciated, the state diagram shown in FIG. 3 is an example that is depicted purely for the sake of conceptual clarity. Embodiments according to the present invention may formally prove or disprove any other suitable state diagrams.

Figure 4:
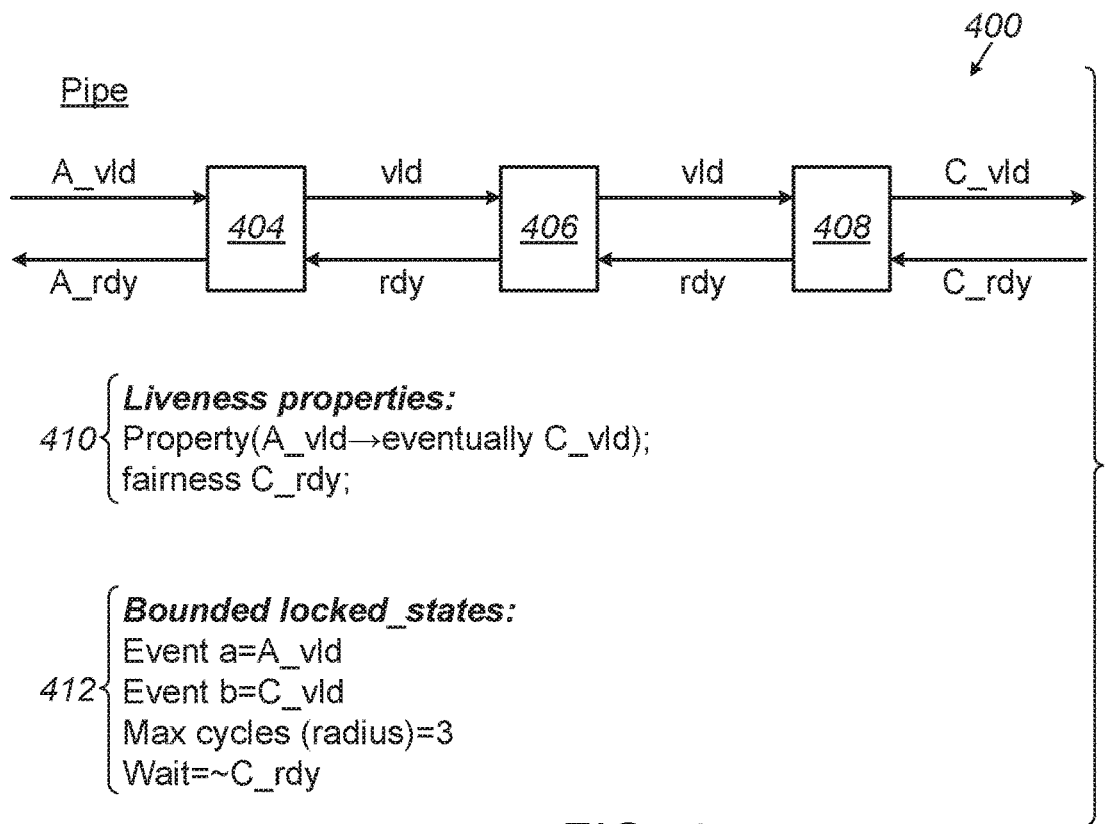
FIG. 4 is a block diagram that schematically illustrates usage of a fairness directive in a locked-state test of a pipe, in accordance with an embodiment of the present invention.

FIG. 4 is a block diagram that schematically illustrates usage of a fairness directive in a locked-state test 400 of a Pipe 402, in accordance with an embodiment of the present invention.

Pipe 402 comprises a first-stage 404, a second-stage 406 and a third-stage 408. Each stage receives data (not shown) and a Valid (vld) signal from the upstream neighbor stage; that is—stage 408 receives a vld input from stage 406 and stage 406 receives a vld input from stage 404. Stage 404 receives a vld input (A_vld) from an external source and stage 408 send a vld output (C_vld) to an external sink; the external source and sink are not shown.

Each stage sends data (not shown) and a data-ready (rdy) to the downstream neighbor stage; that is—stage 408 sends a rdy output to stage 406 and stage 406 sends a rdy output to stage 404. Stage 408 sends a rdy (A_rdy) output to an external consumer and stage 408 receives a rdy input (C_rdy) from an external source; the external sink and source are not shown.

Data flow through pipe 402 may take numerous clock cycles, and hence, a fairness directive is required to formally prove that there are no locked states in the pipe. A good fairness signal is the A_vld—the pipe stalls when A_vld is inactive.

FIG. 4 further comprises a liveness test ("property") 410, which describes how a liveness tool may be invoked to prove that there are no locked states in pipe 402 when A_vld is on; and a bounded-locked-states test 412, which invokes a formal verification safety tool, to prove that the maximum distance from A_vld to C_vld, eliminating from the count states wherein C_rdy is not on, is not greater than 3.

Executing bounded-locked-states test 412 using a safety tool may be faster and/or require fewer computing resources than executing the liveness test of step 410.

Figure 5:
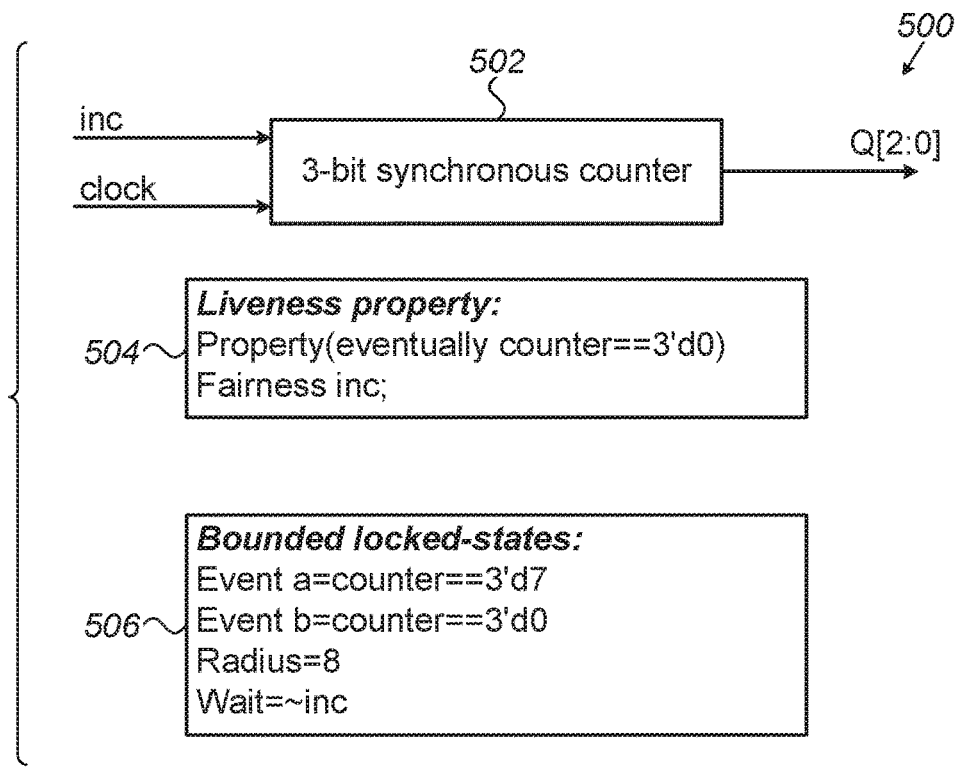
FIG. 5 is a block diagram that schematically illustrates usage of a fairness directive in a locked-state test of a counter, in accordance with an embodiment of the present invention.

FIG. 5 is a block diagram that schematically illustrates usage of a fairness directive in a locked-state test 500 of a counter 502, in accordance with an embodiment of the present invention. Counter 502 is a 3-bit synchronous counter, having an Increment (inc) input, a clock input an a three-bit output Q[2:0]. A Verilog RTL description of counter 502 may be, for example:

```
module counter(
  input clock,
  input inc,
  output reg [2:0] Q);
always @(posedge clock) if (inc) Q<=Q+3'd1;
endmodule
```

FIG. 5 further comprises a Liveness Test ("property") 504, which describes how a liveness tool may be invoked to prove that there are no locked states in counter 502 when inc is on; and a Bounded Locked-States Test 504, which invokes a formal verification safety tool, to prove that the maximum distance from the state in which Q[2:0]=decimal-7, to the state in which Q[2:0]=decimal-0, eliminating from the count states wherein inc is not on.

Executing bounded-locked-states test 506 using a safety tool may be faster and/or require fewer computing resources than executing the liveness test of step 504.

The block diagrams illustrated in FIGS. 4 and 5 are circuit examples that are depicted purely for the sake of conceptual clarity. Embodiments according to the present invention may be employed to prove or disprove locked state in any other suitable circuits, which may include, for example, logic arbitrators, shift registers, processors, data compression/decompression circuits and many others. In some embodiments the wait fairness directive may be a Boolean function of more than one signal, and in some embodiments no wait signal is used.

Bounded Latency Proof

In some embodiments, the techniques described above may be used for testing the maximum latency of a digital circuit. Latency is typically defined as the time interval between the stimulation and response in a digital circuit. According to an embodiment, to prove that the latency is not longer than X cycles, the user may run a bounded locked-states test, defining the stimulation input as the start-state, the response event as the end-state, and use X for the radius. Thus, a formal verification safety tool may be employed to efficiently prove/disprove the maximum latency of a digital circuit.

Although the embodiments described herein mainly address formal proving and disproving of locked states and latency in digital designs measured in clock cycles, methods and systems described herein can also be used to measure signal pulses rather than clocks.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus for digital circuit verification, the apparatus comprising:
    a memory, configured to store (i) a model of at least part of a digital circuit that comprises a finite state machine (FSM) having multiple states and (ii) a list of one or more locked-state tests, each locked-state test specifying (i) a start state from among the states of the FSM, (ii) an end state from among the states of the FSM and (iii) a radius parameter; and
    a processor, configured to formally prove that for at least one of the locked-state tests, a maximum number of cycles in the FSM between the start state and the end state is bounded by a number that is not greater than the radius parameter, thereby verifying that the start state is not a locked state.

2. The apparatus according to claim 1, wherein at least one of the locked-state tests further specifies a wait signal, and wherein the processor is configured to measure numbers of cycles in the FSM between the start state and the end state while excluding cycles wherein the wait signal is active.

3. The apparatus according to claim 1, wherein, for at least one of the locked-state tests, the start state comprises an event wherein a stimulus is applied to the digital circuit, the end state comprises an event wherein the digital circuit generates a response responsive to the stimulus, and the radius comprises a maximum response time of the digital circuit.

4. A method for digital circuit verification, the method comprising:
    storing, in a memory, (i) a model of at least part of a digital circuit that comprises a finite state machine (FSM) having multiple states and (ii) a list of one or more locked-state tests, each locked-state test specifying (i) a start state from among the states of the FSM, (ii) an end state from among the states of the FSM and (iii) a radius parameter; and
    using a processor, formally proving that for at least one of the locked-state tests, a maximum number of cycles in the FSM between the start state and the end state is bounded by a number that is not greater than the radius parameter, thereby verifying that the start state is not a locked state.

5. The method according to claim 4, wherein at least one of the locked-state tests further specifies a wait signal, and wherein verifying that the start state is not a locked state comprises measuring numbers of cycles in the FSM between the start state and the end state while excluding cycles wherein the wait signal is active.

6. The apparatus according to claim 4, wherein, for at least one of the locked-state tests, the start state comprises an event wherein a stimulus is applied to the digital circuit, the end state comprises an event wherein the digital circuit generates a response responsive to the stimulus, and the radius comprises a maximum response time of the digital circuit.

7. A computer software product, the product comprising a tangible non-transitory computer-readable medium in which program instructions are stored, which instructions, when read by a processor, cause the processor to:
  store, in a memory, (i) a model of at least part of a digital circuit that comprises a finite state machine (FSM) having multiple states and (ii) a list of one or more locked-state tests, each locked-state test specifying (i) a start state from among the states of the FSM, (ii) an end state from among the states of the FSM and (iii) a radius parameter; and
  formally prove that for at least one of the locked-state tests, a maximum number of cycles in the FSM between the start state and the end state is bounded by a number that is not greater than the radius parameter, thereby verifying that the start state is not a locked state.

8. The apparatus according to claim 7, wherein at least one of the locked-state tests further specifies a wait signal, and wherein the instructions cause the processor to measure number of cycles in the FSM between the start state and the end state while excluding cycles wherein the wait signal is active.

9. The apparatus according to claim 7, wherein, for at least one of the locked-state tests, the start state comprises an event wherein a stimulus is applied to the digital circuit, the end state comprises an event wherein the digital circuit generates a response responsive to the stimulus, and the radius comprises a maximum response time of the digital circuit.

10. An apparatus for verification of a digital circuit, the apparatus comprising:
  a memory, configured to store a model of at least part of the digital circuit and a list of one or more locked-state tests, each locked-state test comprising a start state, an end state and a radius parameter; and
  a processor, configured to formally prove that for at least one of the locked-state tests, a maximum distance between the start state and the end state is bounded by a number that is not greater than the radius parameter, thereby verifying that the start state is not a locked state,
  wherein at least one of the locked-state tests further specifies a wait signal, and wherein the processor is configured to measure distances between the start state and the end state while excluding cycles wherein the wait signal is active.

11. An apparatus for verification of a digital circuit, the apparatus comprising:
  a memory, configured to store a model of at least part of the digital circuit and a list of one or more locked-state tests, each locked-state test comprising a start state, an end state and a radius parameter; and
  a processor, configured to formally prove that for at least one of the locked-state tests, a maximum distance between the start state and the end state is bounded by a number that is not greater than the radius parameter, thereby verifying that the start state is not a locked state,
  wherein, for at least one of the locked-state tests, the start state comprises an event wherein a stimulus is applied to the digital circuit, the end state comprises an event wherein the digital circuit generates a response responsive to the stimulus, and the radius comprises a maximum response time of the digital circuit.

12. A method for verification of a digital circuit, the method comprising:
  storing, in a memory, a model of at least part of the digital circuit and a list of one or more locked-state tests, each locked-state test comprising a start state, an end state and a radius parameter; and
  using a processor, formally proving that for at least one of the locked-state tests, a maximum distance between the start state and the end state is bounded by a number that is not greater than the radius parameter, thereby verifying that the start state is not a locked state,
  wherein, for at least one of the locked-state tests, the start state comprises an event wherein a stimulus is applied to the digital circuit, the end state comprises an event wherein the digital circuit generates a response responsive to the stimulus, and the radius comprises a maximum response time of the digital circuit.

13. A computer software product, the product comprising a tangible non-transitory computer-readable medium in which program instructions are stored, which instructions, when read by a processor, cause the processor to:
  store, in a memory, a model of at least part of the digital circuit and a list of one or more locked-state tests, each locked-state test comprising a start state, an end state and a radius parameter; and
  formally prove that for at least one of the locked-state tests, a maximum distance between the start state and the end state is bounded by a number that is not greater than the radius parameter, thereby verifying that the start state is not a locked state,
  wherein at least one of the locked-state tests further specifies a wait signal, and wherein the instructions cause the processor to measure distances between the start state and the end state while excluding cycles wherein the wait signal is active.

* * * * *